Figure 2:
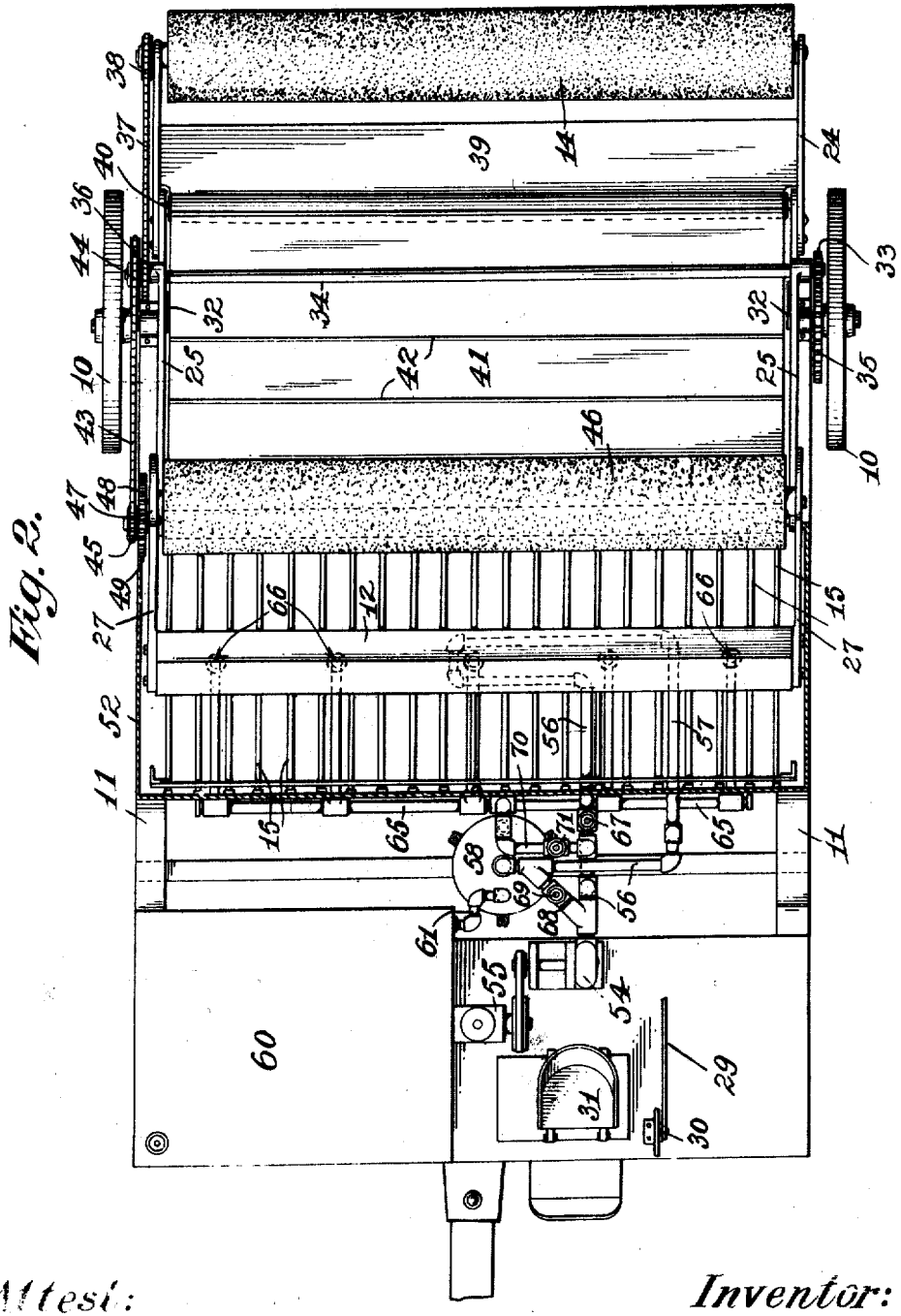

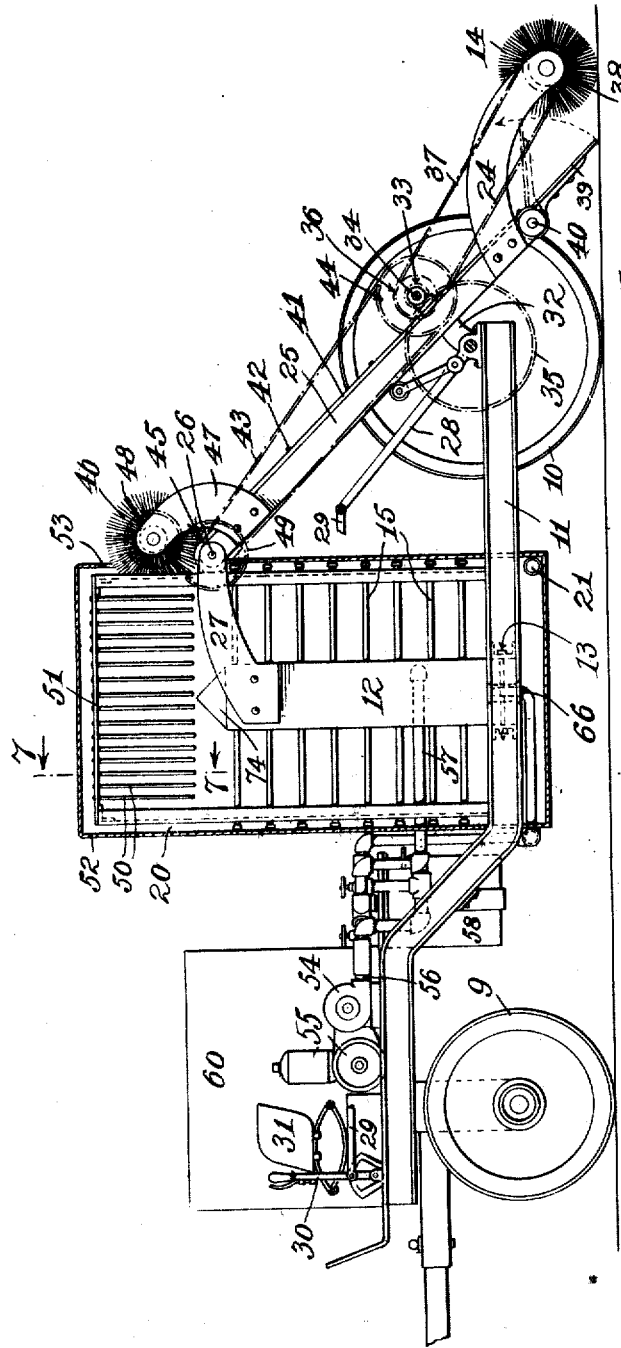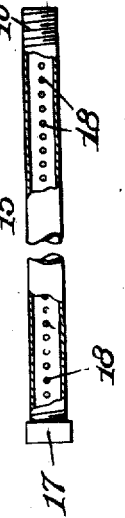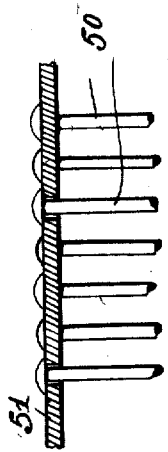

G. P. VAN WYE.
SNOW MELTING APPARATUS.
APPLICATION FILED OCT. 8, 1910.

1,004,113.

Patented Sept. 26, 1911.
4 SHEETS—SHEET 2.

Attest:
Inventor:
Garry P. Van Wye

G. P. VAN WYE.
SNOW MELTING APPARATUS.
APPLICATION FILED OCT. 8, 1910.
1,004,113.
Patented Sept. 26, 1911.
4 SHEETS—SHEET 3.
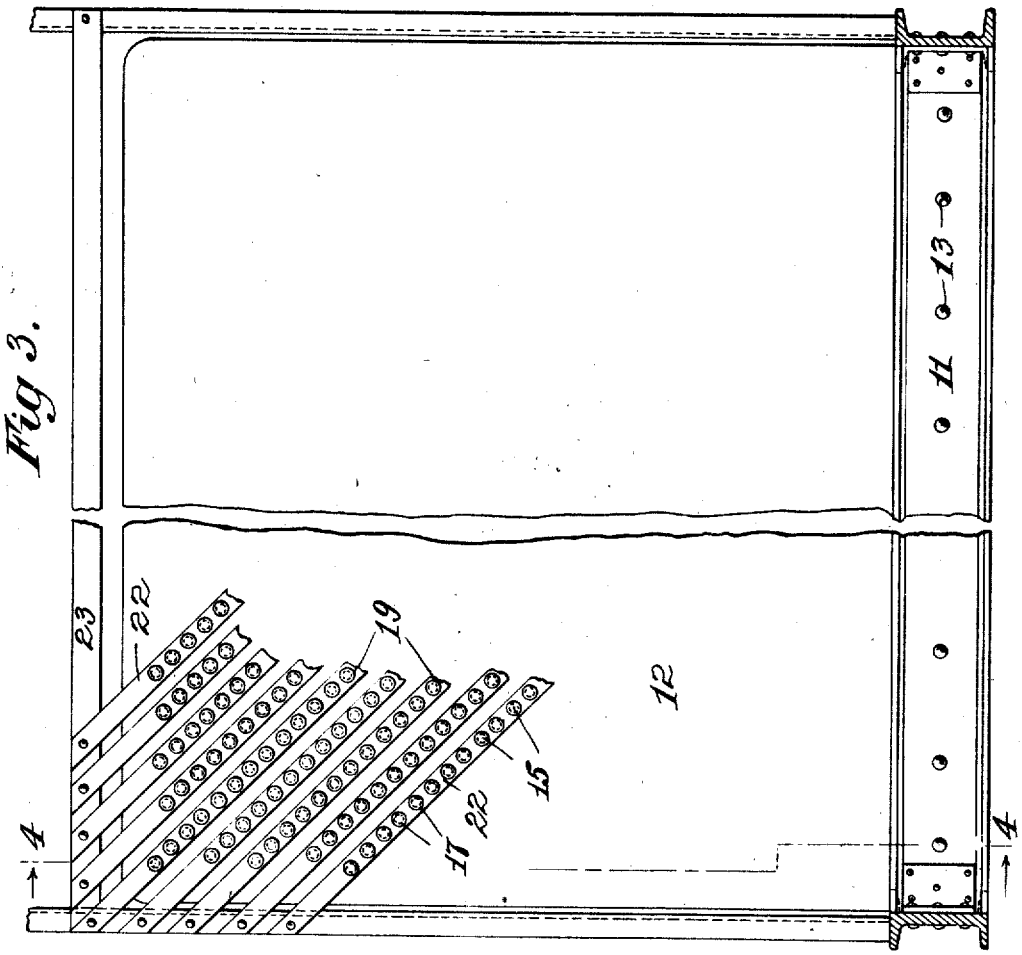
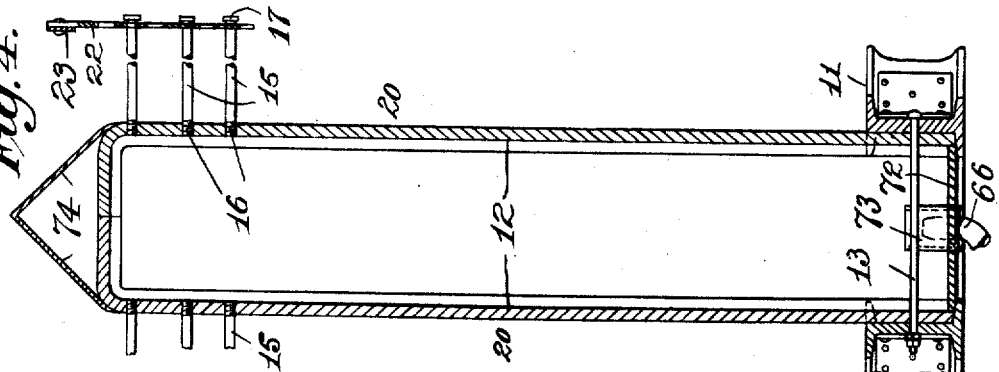

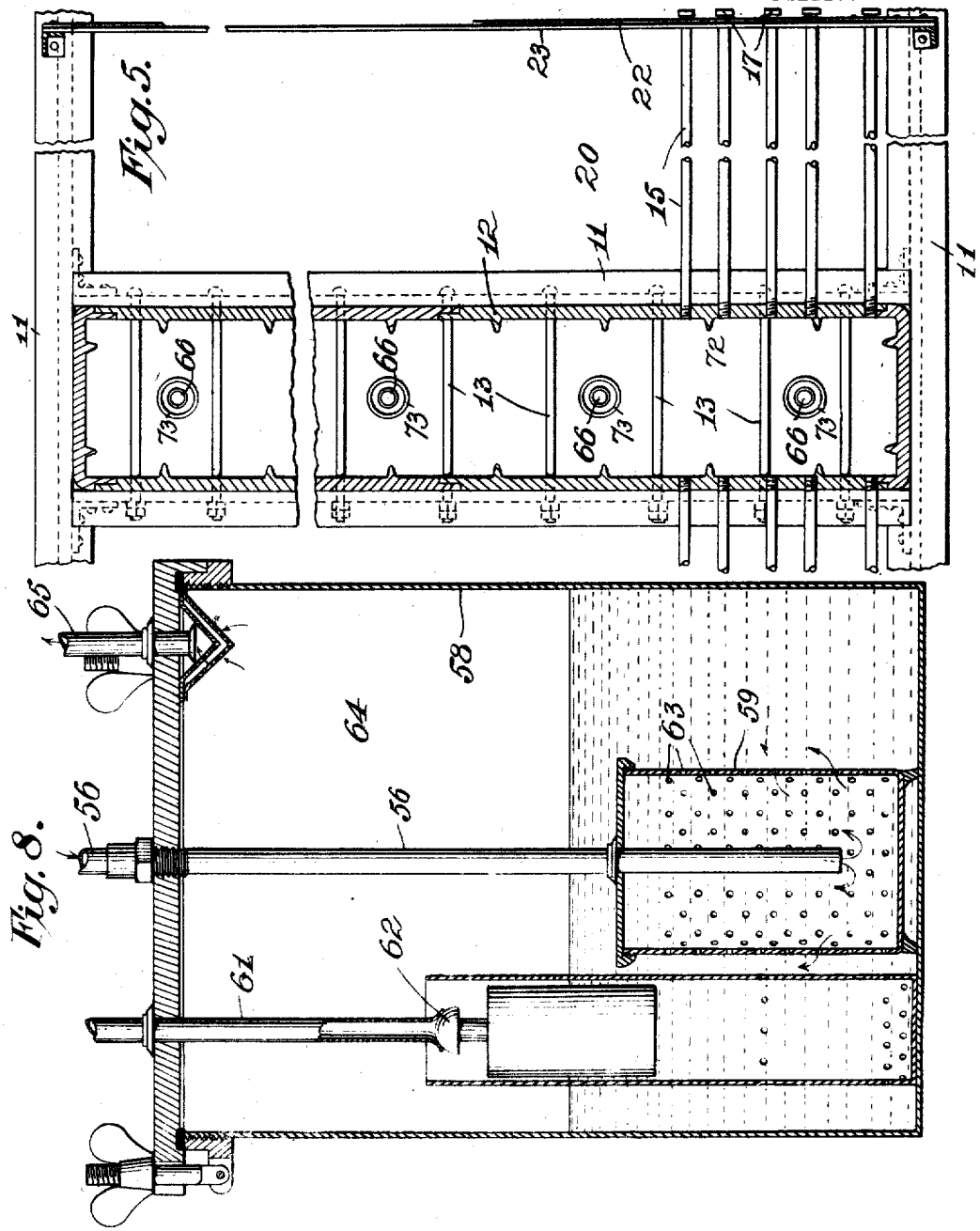

UNITED STATES PATENT OFFICE.

GARRY P. VAN WYE, OF NEW YORK, N. Y.

SNOW-MELTING APPARATUS.

1,004,113.

Specification of Letters Patent.  Patented Sept. 26, 1911.

Application filed October 8, 1910.  Serial No. 585,994.

*To all whom it may concern:*

Be it known that I, GARRY P. VAN WYE, a citizen of the United States, residing at New York, in the county and State of New York, have invented a new and useful Snow-Melting Apparatus, of which the following is a specification.

This invention relates to apparatus for melting snow, and has for its object to provide a suitable device to melt the snow in city streets thereby removing from the streets snow detrimental to traffic.

It is the purpose of this invention to: 1, provide apparatus which will melt the snow rapidly thereby clearing the streets from snow within a short time after it has been precipitated; 2, provide apparatus which will melt the snow with the least possible expenditure of heat; and 3, provide apparatus which will use cheap fuel in a manner to produce the required heat without producing an appreciable amount of smoke.

I accomplish these objects: 1, by providing a melting chamber of considerable size, and by disposing melting surfaces therein in a manner to insure the speedy melting of any snow passing therethrough; 2, by providing apparatus for separating the snow particles and passing them through said melting chamber while separated whereby the snow particles will be attacked individually by said melting surfaces, and will be melted individually undeterred by the latent heat of any other particles; 3, by providing apparatus in which a large percentage of the heat units generated by combustion will be utilized in melting the snow; 4, by providing means to distribute the heat units generated by combustion to the melting surfaces in an effective manner; and 5, by providing apparatus for burning fuel in a substantially smokeless manner.

In apparatus for melting snow hitherto devised it has been customary to provide means for projecting the heat into, or against a mass of snow, or to pass a mass of snow over a heated surface, or plate. In attacking the snow in this way, only the surface of the mass is reached as the heat units will not penetrate the mass. Even where the mass of snow is mounted over the end of a steam pipe, the steam will quickly form a chamber within the mass, and possibly channels therethrough, but then only the surface of the chamber, or walls of the channels are attacked by the steam, and the body of the snow is melted away only as the surface is melted.

It may be observed that a snow flake allowed to light on a person's hand will not remain unmelted a sufficient length of time to allow of a clear examination of the snow crystals; but a mass of snow formed into a snow ball can be held in the hands without the perceptible melting of any of the external particles. Thus, the latent heat of the mass of snow forming the snow ball assists the exposed particles from being melted by the heat of the hands. On the same principle, a mass of snow attacked by melting apparatus will resist the action of the heat; and will not be melted except by the expenditure of an excessive amount of heat units. This may be further observed by the melting of the snow in the spring. Where large drifts have existed, part of the snow forming the same will remain unmelted even when the atmosphere has been warm for a considerable time, and all the snow of less depth has long since melted. Some have endeavored to meet these conditions by stirring up the snow on the ground while directing heated air, or steam against it; but the method is wasteful of heat energy, and is not effective for the quick removal of snow from the streets.

It is the purpose of this invention to pick the snow up, separate it into small particles, and then drop these particles through a melting chamber which is also filled with melting surfaces so disposed that stones, pieces of ice, and the like, may pass through without obstructing the chamber, while the small particles of snow would be certain to come in contact with one or more of the melting surfaces.

A further object is at burn a liquid fuel, as crude petroleum, in a way so the heat can be regulated to the speed of the apparatus along the street, and the depth of the snow, whereby the water will be delivered from the apparatus, derived from the melting of the snow, at a temperature warm enough to insure the flow of the same into the sewer.

The invention is illustrated in the accompanying drawings, in which—

Figure 1, is a side elevation of a snow melting apparatus constructed according to my invention,—a side of the melting chamber casing being removed to expose the interior; Fig. 2, is a top plan view thereof; Fig. 3, is a diagrammatic view showing the disposition of the melting tubes; Fig. 4, is a sectional view of the furnace, on the line 4—4 of Fig. 3, and showing in elevation one of the burners entering the furnace; also showing diagrammatically how the melting tubes communicate with the interior of the furnace, and how supported; Fig. 5, is a transverse section of the furnace, a plan of the burners, and a diagrammatic view of the melting tubes; Fig. 6, is a top plan view of one of the melting tubes on an enlarged scale, a part being broken away to show the perforations in the bottom of the tube; Fig. 7, is a view on an enlarged scale, of a portion of the snow-checking and disintegrating pins, or rods, and of the supporting plate therefor, on the line 7—7 of Fig. 1; and, Fig. 8, is a sectional elevation, on an enlarged scale of a carbureter which I may employ.

In the accompanying drawings, like numerals of reference refer to the same parts in each of the views.

As shown in the drawings I have provided a snow melting apparatus adapted to use a liquid fuel, although I do not limit my invention to the use of liquid fuel as the essential part of my invention does not consist of the special plan for burning any kind of fuel; but is directed to the principle of melting snow by an apparatus adapted to carry the snow to a sufficient height to allow it to drop a distance great enough to insure the melting of the snow in considerable quantity; the further essential feature of the invention is the disintegrating of the mass of snow so that it can be attacked by the melting apparatus as particles and not as a mass. It is my object, too, to provide means for the utilization of a large percentage of the heat units generated by the combustion of the fuel in the actual work of melting snow and to distribute the heat in such a way as to bring it in direct contact with all of the melting surfaces, and then to allow the heated air and gas to escape into the melting chamber in a well distributed manner.

While I have stated that my invention in its main features does not include the gasifying and burning apparatus; yet, under present methods of burning fuel, a liquid fuel seems to offer the best means for the production of heat in sufficient quantities without the production of smoke to an appreciable extent; and for this reason I have illustrated and described my carbureter with considerable minuteness.

As shown in the drawings I mount my apparatus on a truck consisting of front wheels 9, rear wheels 10, and a frame 11. Midway between the front and rear wheels I mount a furnace 12, preferably made of heavy cast iron in sections, which are secured to the frame 11, by bolts 13, or in any desired manner. As I prefer to use liquid fuel in a gasified condition, the furnace is quite short in length; but I prefer to make it of considerable width and equal to the length of the sweeper 14, so that the snow gathered up by the sweeper will pass to the melting chamber without being condensed laterally.

I prefer to make the walls of the furnace 12, of considerable thickness so that when heated they will not be quickly cooled, and also that the walls may form a firm support for the melting tubes 15, which are screwed into the side walls of the furnace, and communicate with the interior thereof. One of these melting tubes is shown on an enlarged scale and partly in section, in Fig. 6. As shown, the end 16, is screw-threaded and adapted to be screwed into one of the walls of the furnace 12. On the outer end I mount a cap 17, to completely close the tube, and the bottom of the tube is provided with a plurality of perforations 18, through which the gases of combustion and heated air from the furnace 12, may escape; and it is my purpose that these perforations in the tubes 15, shall form the only flue, or outlet for the gases of combustion. As shown in part in Fig. 3, these melting tubes are arranged diagonally, or rather, disposed diagonally with reference to the furnace 12, whereby the several rows 19, of melting tubes run downward at an angle, as shown, the rows being spaced some distance apart so that should a stone, or like obstruction enter the melting chamber 20, it will pass downward between the rows 19, of melting tubes, and can be washed out through the discharge tube 21, by the water of the melted snow. The tubes 15, however, are placed comparatively close together in each row 19, but in a staggered position with reference to the tubes in the preceding rows so that the snow falling vertically after being separated into particle will engage with the different tubes at different levels, and will not be held by the tubes at any one level. These tubes are preferably placed in such a staggered relation that a particle of snow in falling would strike a tube 15, about every fourth row. Thus, if the mass of snow passing through the melting chamber was so great that the upper tubes would be chilled thereby to a point where they would not melt the particles, or only partially melt the snow particles, the particles, or partially-melted particles will drop to the next tube, and so on until fully melted, and when melted the water therefrom will engage tubes at lower levels until heated to a sufficient degree so that it can be discharged through the tube 21, hot enough to insure reaching the sewer without freezing.

As in practice the tubes 15, are made quite small, I have provided supporting bars 22, which may be bolted to a frame 23, each bar 22, forming the support for the outer end of each row of tubes 19, as will be clearly seen.

In delivering the snow to the melting chamber, the sweeper 14, is mounted on brackets 24, on a platform 25, pivoted at 26, to brackets 27, which may be secured to the furnace 12, as shown, or to any suitable support. This platform 25, may be controlled by a bell crank lever 28, link, or rod 29, and lever 30, from the driver's seat 31, whereby the sweeper 14, may be raised from the ground, as will be readily understood. This platform 25, when the sweeper 14, is in operative position, rests upon a support 32, on the axle, at which time a pinion 33, mounted on a shaft 34, extending transversely of said platform 25, is in mesh with a gear 35, operatively connected with one of the wheels 10. On the other end of the shaft 34, is mounted a sprocket wheel 36, connected by a sprocket chain 37, with a sprocket wheel 38, on the sweeper 14, whereby the sweeper 14 will be rotated when the pinion 33, is in mesh with the gear 35, as will be readily understood; but as this pinion is carried by the frame, or platform 25, it is evident that when the platform is raised by the lever 28, the pinion will be out of mesh with the gear, and the sweeper, 14, will not be rotated.

Pivoted on the lower end of the platform 25, is an apron 39, which may swing on the pivotal connection 40, as indicated in dotted lines, so that the lower edge of this apron will ride upon the snow at whatever depth it may be, as will be understood.

Passing around the platform 25, is an endless apron, or carrier 41, which may be provided with ribs 42, and which may be operated by a sprocket chain 43, from a sprocket wheel 44, on the shaft 34, which is larger in diameter than the sprocket wheel 36, controlling the sweeper 14, while the sprocket wheel 45, controlling the carrier is smaller than either the sprocket wheel 36, or the sprocket wheel 38. Thus, while the shaft 34, will be rotated quite rapidly by the pinion 33, and the sweeper will also be rotated, as designed, about six times as fast as the vehicle advances, the carrier will advance still faster so that the snow being swept thereon by the sweeper will be carried upward so rapidly that it will not accumulate on the carrier equal to one-sixth the depth of the snow on the ground, which would be the case if the carrier moved at the same speed the sweeper rotated. Thus the snow on the carrier will be thinned by the rapidity of motion of the carrier, as will be readily understood.

I further separate the mass of snow by a brush, or sweeper 46, mounted in brackets 47, which is controlled by a pinion 48, in mesh with a gear 49, operated by the carrier mechanism; and as the carrier is carried at greater speed than the sweeper 14, rotates, it is evident that the sweeper 46, will rotate more rapidly than the sweeper 14, and the gear mechanism will make it rotate in the same direction as the sweeper 14, so that the snow will be swept from the carrier by the sweeper 46, directly into the melting chamber 20, and in a further scattered condition, as will be readily understood. To further break up, and divide the snow mass, I have provided dependent rods 50, which may be loosely hung in a plate 51, so that they may be free to swing to a limited extent, as will be evident from Fig. 7; and these rods will not only assist in tearing the snow into particles, but will prevent the mass of particles from being driven by the sweeper 46, to the forward side of the melting chamber 20, and will cause the particles to drop in a distributed manner in all parts of the melting chamber.

The melting chamber 20, is made up of the furnace 12, the melting tubes 15, forming the flues for the furnace and also the melting surfaces, and an inclosing casing 52, having an opening 53, in which the sweeper brush 46, is partly mounted, and in which it is free to move inward a short distance when the platform 25, is raised.

As shown in the drawings, provision is made for burning a liquid fuel, as gasolene, petroleum, or crude oil. In order to avoid all smoke, or substantially all smoke from a fuel of this kind I prefer to burn the fuel in a gasified condition, or as carbureted air. With this end in view I have provided a blower, as 54, which may be run by a gasolene engine 55. The carbureter is particularly shown in Fig. 8, and the arrangement of pipes is shown in Figs. 1 and 2.

As shown, air passes from the blower through the pipe 56, into the furnace 12, where it is doubled upon itself, as clearly shown in dotted lines in Fig. 2, so that when the pipe emerges from the furnace at 57, the air will be sufficiently heated to absorb considerable oil vapor and cause the oil to vaporize while passing through the same. This pipe 56, is then carried to the carbureter 58, which it enters, as shown in Fig. 8, and is carried downward within a perforated chamber 59, where it ends. An oil tank 60, is provided from which a pipe 61 leads into the carbureter 58, and the admission of oil from the tank to the carbureter is regulated by a float valve 62, which is so regulated that the chamber 59, will always be submerged; and when the heated air is blown into the same through the pipe 56, it will pass out of this chamber through the perforations 63, in the walls thereof in a finely divided manner, through the body of oil contained within the carbureter, and will then pass upward into the chamber 64, above the oil, and out through the pipe 65, and thence to the several burners 66, within the furnace 12, where it may be ignited and burned.

The flow of air through the pipe 56, is controlled by a valve 67, and a cut off pipe is provided, as 68, which connects the pipe 56, as it leaves the blower, with the portion thereof entering the carbureter; and this connecting pipe is provided with a valve 69. Thus if the air passing into the carbureter through the furnace 12, is heated too much to properly gasify the liquid fuel, the valve 67, may be partly closed, and the valve 69, may be opened to a greater or less extent, as may be desired to produce the proper carbureted air for burning. Thus too, is provision made for admitting air from the blower to the tube 65, without having it pass through the carbureter. This is accomplished by the intersecting pipe 70, having a valve 71, through which air may be allowed to pass from the blower directly to the burners should the air from the carbureter be too highly charged for burning properly.

The bottom of the furnace 12, is closed by a plate 72, in which may be mounted a plurality of enlarged tubes 73, larger than the burners 66, and preferably of greater length, so that when the carbureted air is blown into the furnace and ignited it will carry with it sufficient air to sustain combustion, drawing the air upward through the tubes 73. As the tubes 73, are regulated in size corresponding with the burners it is evident that the products of combustion will not return through these tubes, but will pass outward through the melting tubes 15, and escape through the perforations 18, therein, and out of the opening 53, in the casing 52; but before passing out of the casing it is evident the heat units will be almost entirely extracted by the incoming snow. I may also provide a cap, or hood 74, for the top of the furnace, conical in shape in cross section, to prevent the snow resting on top of the furnace to chill the same.

The operation will be readily understood from the foregoing description, taken with the accompanying drawings. The engine 55, having been started, and the furnace 12, heated, by the burning of the carbureted air as described, the platform 25, is lowered until it rests upon the support 32, at which time the sweeper will be on the ground, and the pinion 33, will be in mesh with the gear 35, so that as the apparatus is drawn forward, the sweeper 14, will be rotated. As the apron 39, always rests upon the snow, and the sweeper 14, is rotated with the hands of a clock, it is evident that the snow will be driven by the sweeper upon the carrier 41, and will be carried upward to the brush, or sweeper 46, which will further tear it apart and drive it into the melting chamber where it will come in contact with the loosely mounted rods, or wires 50, and will be further broken up and will be directed downward upon the melting tubes 15. As these tubes form the flues from the furnace, it is evident that the heat from the furnace will keep the same constantly hot, and as the gases of combustion also pass from these tubes it will be from the under side so that the gas will pass around the tubes upward thereby assisting in keeping the tubes hot and also in melting any snow which may come in contact therewith. In this way nearly all of the heat units generated by the combustion of the fuel will be utilized in actually melting snow, as will be clearly seen, and these heat units will be directed against the snow while the snow is in finely divided particles thereby placing it in the very best condition for melting easily since the cold contained in any particle of snow will not materially aid any other particle in resisting the heat energy. Then, too, as the heat ascends upward, and as the snow, and water therefrom always descends, as the upper tubes become cooled in the melting process the lower tubes will catch the descending particles and partly melted snow and will melt and heat the same to a proper temperature for discharging.

By burning liquid fuel in the manner described, no provision need be made for smoke, and should the water from the discharge pipe be too cold, additional air may be turned on thereby increasing the heat energy at the will of the operator. The apparatus can thus be readily controlled and regulated to obtain the heat required to melt the snow whether the fall be a light one, or a heavy one, and also according to the speed of the apparatus along the street when the snow would be picked up more or less rapidly.

Having thus described my invention what I claim as new and desire to secure by Letters Patent of the United States, is—

1. A snow melting apparatus comprising a melting chamber, means to pass snow thereinto in finely separated particles, and means to apply heat to said particles while separated.

2. A snow melting apparatus comprising a melting chamber, means to carry snow to the upper part thereof, and means to separate the snow into finely divided particles while elevated and drop the separated particles through said melting chamber.

3. A snow melting apparatus comprising a melting chamber having a plurality of separated heating surfaces, and means to drop snow on said surfaces in finely separated particles.

4. A heat applying apparatus comprising a chamber, a furnace, or the like mounted therein, a plurality of tubes mounted in the side walls of said furnace and communicating with the interior thereof, and means to drop the material to be acted upon on said tubes in finely divided particles.

5. A snow melting apparatus comprising a furnace, means to introduce a gas thereinto and burn the same, a plurality of tubes forming the flues for said furnace, and means to drop snow on said tubes in separated particles.

6. A snow melting apparatus comprising a melting chamber, means to carry snow to the upper part thereof, and means to separate the snow into comparatively small particles and drop the same through said chamber in a distributed manner.

7. A snow melting apparatus comprising a melting chamber having a plurality of separated heating surfaces, means to carry snow above said heated surfaces and separate the same into comparatively small particles while elevated, and means to distribute the separated particles over said heated surfaces.

8. In a snow melting apparatus, a tube communicating with the combustion chamber, said tube being closed at the outer end, and having a plurality of perforations in the bottom thereof, and means to drop snow on said tube in separated particles.

9. A snow melting apparatus comprising a melting chamber having a combustion chamber and a plurality of tubes communicating with the interior thereof each of which is closed at the outer end, and is provided with a plurality of perforatons in the bottom thereof, and means to carry snow to the upper part of said chamber and drop it on said tubes in separated particles.

10. A snow melting apparatus comprising a melting chamber having a combustion chamber and a plurality of tubes communicating with the interior of said combustion chamber, each of said tubes being closed at the outer end, and having a plurality of perforations in the bottom thereof, means to carry snow to the upper part of said melting chamber, and means to separate said snow into comparatively small particles and drop the same on said tubes while separated.

11. A snow melting apparatus comprising a melting chamber, a carrier adapted to deliver snow to the upper part of said chamber, a sweeper adapted to sweep the snow from the street onto said carrier, and a second sweeper adapted to sweep the snow from said carrier into said chamber.

12. A snow melting apparatus comprising a melting chamber, a carrier adapted to deliver snow to the upper part of said chamber, a sweeper adapted to sweep the snow from the street to said carrier, a second sweeper adapted to sweep the snow from said carrier into said chamber, and means to operate the carrier and upper sweeper at a greater speed than the lower sweeper.

13. A snow melting apparatus comprising a melting chamber, a carrier adapted to deliver snow to the upper part of said chamber, a sweeper adapted to sweep the snow from the street onto said carrier, and a swinging apron pivotally connected with the lower end of said carrier and adapted to ride on the snow in front of said sweeper whereby the snow from said sweeper is directed onto said carrier.

14. A snow melting apparatus comprising a melting chamber, a carrier adapted to deliver snow to the upper part thereof, a sweeper adapted to sweep the snow from the street to said carrier, a second sweeper adapted to sweep the snow from said carrier into said chamber, and means within said chamber to check the snow from said sweeper at different points longitudinally of said chamber.

15. A snow melting apparatus comprising a melting chamber, a carrier adapted to deliver snow to the upper part thereof, a sweeper adapted to sweep the snow from the street onto said carrier, a second sweeper adapted to sweep the snow from said carrier into said chamber, and a plurality of pendant rods within said chamber in staggered relation adapted to engage the snow from said second sweeper, for the purpose set forth.

16. In a snow melting apparatus, a combustion chamber, and a plurality of tubes mounted in the side walls and in communication with the interior thereof, said tubes being closed at the free end, and being provided in the bottom thereof with a plurality of perforations.

17. In a snow melting apparatus, a combustion chamber, and a plurality of tubes mounted in the side wall thereof and in communication with the interior, said tubes being arranged in diagonal rows and being staggered relative to each other vertically, and each tube being closed at the outer end and provided with a plurality of perforations.

18. In a snow melting apparatus a combustion chamber, means to pass air through a liquid fuel and burn the carbureted air within said chamber, and a plurality of perforated tubes forming the flues for said chamber, for the purpose set forth.

19. In a snow melting apparatus a combustion chamber, means to pass air through a liquid fuel and burn the carbureted air within said chamber, a plurality of perforated tubes forming the flues for said chamber, and means to drop snow on said tubes.

20. In a snow melting apparatus a combustion chamber, means to pass air through a liquid fuel and burn the carbureted air within said chamber, a plurality of perforated tubes forming the flues for said chamber, and means to drop snow on said tubes in comparatively small particles.

21. In a snow melting apparatus a combustion chamber, means to pass air through said chamber and through a liquid fuel and burn the carbureted air within said chamber, a plurality of perforated tubes communicating with said chamber, and means to drop snow on said tubes.

22. In a snow melting apparatus a combustion chamber, means to pass air through said chamber and through a liquid fuel and to burn the carbureted air within said chamber, a plurality of perforated tubes mounted in the walls of said chamber and forming an outlet for the products of combustion, and means to drop snow in comparatively small particles on said tubes.

23. The herein described snow melting apparatus comprising a melting chamber composed of a combustion chamber and a plurality of perforated tubes forming the outlet for the products of combustion, a carbureter and means to pass air through the same and burn the carbureted air within said chamber, a carrier, a sweeper adapted to sweep the snow from the street onto said carrier, a second sweeper adapted to sweep the snow from said carrier into said melting chamber, and a plurality of dependent rods adapted to distribute the snow within said melting chamber, for the purpose set forth.

24. A snow melting apparatus comprising a furnace, means to burn a fuel within the same, a plurality of tubes forming the flues of said furnace, a part of said tubes being mounted above the others whereby the snow will drop substantially vertically from tube to tube, part of said tubes having a plurality of perforations through the wall thereof, and means to drop snow on said tubes.

Dated at New York, this 7th day of October, 1910.

GARRY P. VAN WYF.

Witnesses:
L. FRIEDMAN,
E. A. WEST.